June 8, 1965 R. J. BYMERS 3,188,492

CLAMP LEVEL CONTROL CIRCUIT

Filed Oct. 15, 1962

INVENTOR
RONALD J. BYMERS
BY John C Black
ATTORNEY 3,188,492

CLAMP LEVEL CONTROL CIRCUIT

Ronald J. Bymers, Vestal, N.Y., assignor to International Business Machines Corporation, New York, N.Y., a corporation of New York Filed Oct. 15, 1962, Ser. No. 230,324
12 Claims. (Cl. 307—88.5)

Figure 1:
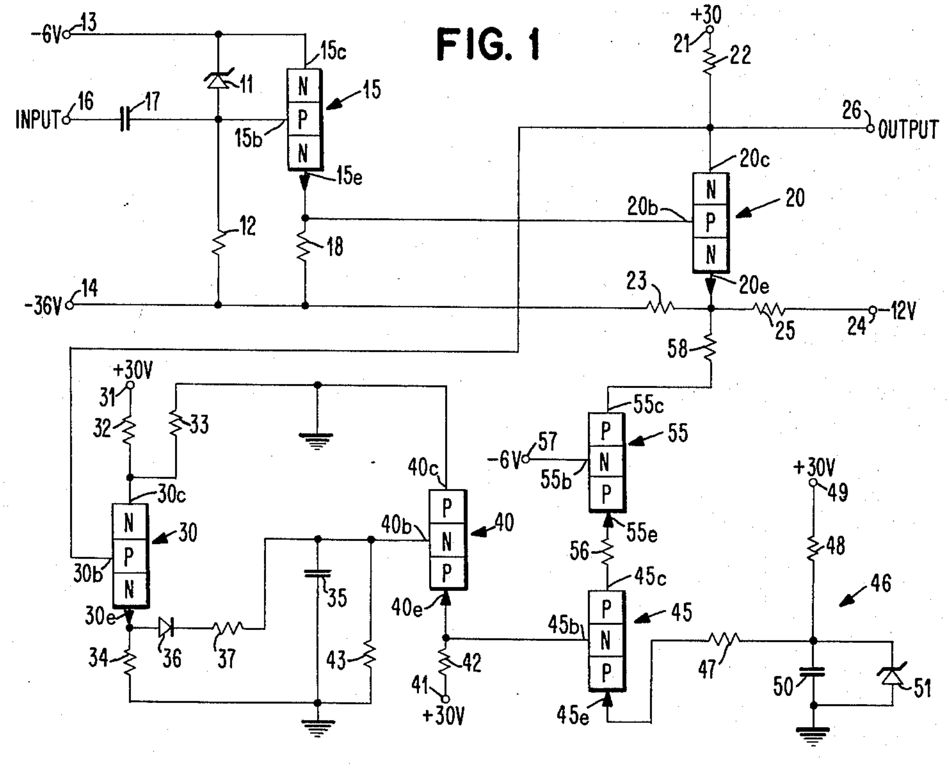

This invention relates to an improved circuit for clamping an unreferenced A.C. signal at a fixed D.C. level.

The circuit of the present application has been particularly adapted for use in character recognition equipment; however, it will be appreciated that the invention is to be limited only to the extent set forth in the appended claims.

The waveform generated by optical scanning equipment during the scanning of characters is generally in the form of an unreferenced A.C. signal. Before the signal is applied to the various logic devices for identification of each character, it is necessary to reference the signal to a fixed D.C. level. One of the more difficult problems involved with circuits for referencing signals with respect to a fixed D.C. level is that of preventing variation in the fixed level caused by component and voltage source variations. In certain types of equipment, the level can vary as much as 10 volts under worst case conditions. It is therefore desirable to provide means for accurately and reliably referencing the signals to a precise D.C. level.

A particularly desirable feature is the provision of isolation between the clamp circuit and the circuit output in order to give a controlled output impedance. This isolation is difficult to achieve without sacrificing the accuracy of the D.C. restoration level set by the clamp circuit.

It is therefore a primary object of the present invention to provide an improved, highly accurate circuit for clamping an unreferenced A.C. signal at a fixed D.C. level.

It is another important object of the present invention to provide in the circuit of the preceding paragraph improved means for isolating the clamp circuit from the circuit output.

These objects are achieved in one preferred embodiment of the invention by providing a zener diode input clamp circuit having its output applied to the base of a common collector transistor circuit, the output of which is fed to the base of a common emitter transistor circuit. The collector of the common emitter circuit is coupled to a feedback network which compares the D.C. reference level at the collector with a standard reference voltage and converts the voltage difference into a current which is fed back into the emitter of the common emitter stage to control the reference level with a high degree of accuracy.

A novel feature of the present invention is the utilization of all three terminals of the common emitter circuit to attain certain desired results. Three functions must be performed, i.e., a clamp level must be established; an output terminal with a controlled and constant impedance level must be provided; and a feedback point must be included, at which a control signal proportional to the difference between the output and a fixed reference, can be inserted back into the common emitter circuit. The problem is to perform all three of these functions with the least amount of interaction or interference between the individual processes. This isolation should be performed with as few components as possible to minimize cost and the extra tolerance problems introduced by additional components. The preferred embodiment accomplishes this by utilizing the high impedance base terminal as a load on the clamp circuit, the high impedance collector terminal as an output whose impedance can be controlled by a fixed resistor, and the low impedance emitter terminal as the load on the feedback control current source. Thus all three functions are achieved in one device with little interference.

The foregoing and other objects, features and advantages of the invention will be apparent from the following more particular description of a preferred embodiment of the invention, as illustrated in the accompanying drawings.

Figure 2:
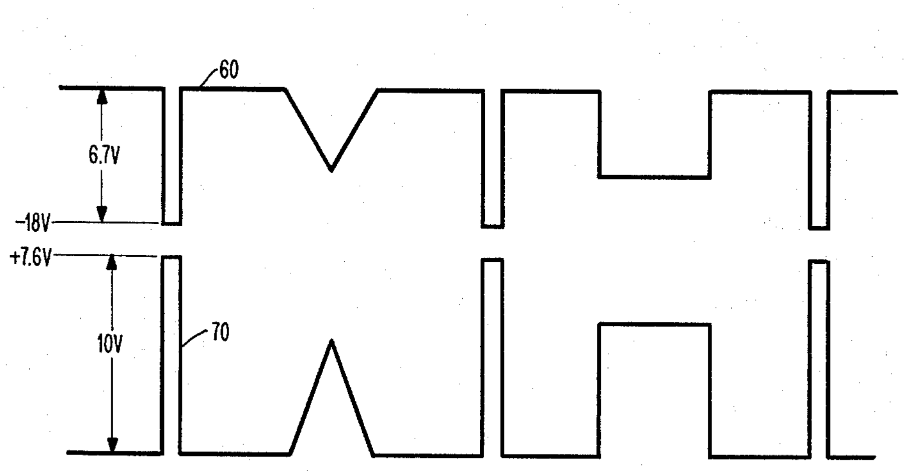

In the drawings:

FIG. 1 is a schematic diagram illustrating a preferred form of the invention; and FIG. 2 illustrates typical waveforms appearing at the input clamp and at the output of the circuit illustrated in FIG 1.

The preferred embodiment of FIG. 1 comprises a voltage clamping circuit which includes a zener diode 11 connected in series with a resistor 12 between a pair of voltage source terminals 13 and 14. The junction between the zener diode and the resistor is connected to the base terminal 15*b* of a transistor 15 which is connected in a common collector configuration. The base terminal is also connected to an input terminal 16 by way of a coupling capacitor 17. The collector terminal 15*c* is connected to the source terminal 13 and the emitter terminal 15*e* is connected to the source terminal 14 by way of a bias resistor 18. The emitter terminal 15*e* is also connected to the base 20*b* of a transistor 20 which is connected in a common emitter configuration. The transistor 20 includes a collector terminal 20*c* which is connected to a voltage source terminal 21 by way of a bias resistor 22. The transistor also includes an emitter terminal 20*e* which is connected to the source terminal 14 by way of a resistor 23 and to a second source terminal 24 by way of a resistor 25. The output terminal 26 of the common emitter stage is connected directly to the collector terminal 20*c*.

The collector terminal 20*c* is also coupled to the base terminal 30*b* of a transistor 30 connected in a common collector configuration. The transistor 30 includes a collector terminal 30*c* which is coupled to a positive potential terminal 31 by way of a bias resistor 32 and to ground potential by way of a bias resistor 33. The emitter terminal 30*e* is connected to ground potential by way of a bias resistor 34 and to a capacitor 35 by way of a series connected diode 36 and resistor 37. The other terminal of the capacitor 35 is connected to ground potential. The capacitor 35 is connected to the base terminal 40*b* of a transistor 40 which is connected in a common collector configuration. The collector terminal 40*c* is connected directly to ground and the emitter terminal 40*e* is connected to a positive voltage terminal 41 by way of a bias resistor 42. A resistor 43 is connected in shunt across the capacitor 35.

The emitter terminal 40*e* is connected to the base terminal 45*b* of a transistor 45 which is operated as a differential amplifier. The transistor 45 includes an emitter terminal 45*e* which is connected to a voltage divider 46 by way of a gain control resistor 47. The voltage divider 46 includes a resistor 48 which is connected to a positive voltage terminal 49. A capacitor 50 and a zener diode 51 are connected in parallel between ground potential and the resistor 48. The zener diode establishes a predetermined reference potential across the capacitor 50. The collector terminal 45*c* of the differential amplifier is connected to the emitter terminal 55*e* of a transistor 55 by way of a resistor 56. The base terminal 55*b* of the transistor 55 is connected to a potential source terminal 57, and the collector 55*c* is connected to the emitter 20*e* by way of a resistor 58.

Unreferenced A.C. signals are fed to the clamp circuit including the zener diode 11 by way of the input terminal 16 and the coupling capacitor 17 and the most negative portion of the input signal 60 is clamped to −18 volts as shown in FIG. 2. This clamped signal is applied to the base of the common collector transistor 15 and is extended through the base-emitter junction of this transistor to the base *20b* of the transistor 20. The inverted and amplified signal 70 at the collector *20c* is shown in FIG. 2.

The common collector stage buffers the high output impedance of the zener diode clamp circuit from the relatively low input impedance of the common emitter stage. The resistors 23 and 25 provide a series feedback in the emitter circuit of the transistor 20 to provide an accurate voltage gain independent of the transistor parameters. These resistors also determine the D.C. emitter current of the transistor 20 to set the collector current which in conjunction with the bias resistor 22 sets the D.C. voltage level at the output terminal 26. In the preferred embodiment, it is desired to maintain this output level at approximately +7.6 volts. Therefore, the output waveform will swing negative from the +7.6 volt reference as shown in FIG. 2. Since the transistor 20 is connected in a common emitter configuration its output impedance is relatively high and therefore the output impedance of the stage is controlled primarily by the value of the resistor 22.

The circuits described so far including the zener diode clamp and the transistors 15 and 20 will provide the desired output voltage clamping or reference level; however, this basic circuit is subject to wide variations in the D.C. reference level at the output incident to component and voltage source variations. This level can vary as much as 10 volts under worst case conditions of plus or minus 5% voltage and component variations.

The circuits for generating a feedback current to stabilize the output reference level will now be described in detail.

The output signal is applied to the base *30b* of transistor 30 which is connected in a common collector circuit. The output voltage is therefore applied by way of the base-emitter junction and the diode 36 and resistor 37 to the capacitor 35. The capacitor 35 charges to the most positive level of the output signal, that is, the reference level and the diode 36 prevents discharge of the capacitor through resistor 37 when the output signal level swings negatively with respect to the reference. The capacitor 35 will discharge through the high resistance shunt resistor 43. Resistor 43 also completes a path for the flow of base current from transistor 40, thereby preventing transistor 40 from overcharging the capacitor 35. If the resistor 43 were removed, the capacitor 35 would charge toward the positive thirty volt supply of the emitter electrode *40e* by way of the resistor 42 and the base-emitter junction.

The potential across the capacitor 35 therefore appears at the emitter terminal *40e* of the transistor 40 and is applied to the base terminal *45b* of the transistor 45. This voltage is then compared with the reference voltage produced by the voltage divider 46. In the preferred embodiment, the voltage which is applied to the capacitor 50 for application to the emitter *45e* is +7.6 volts, that is, the voltage reference level which is desired at the output terminal 26. Resistor 37 provides a fixed voltage drop which guarantees a voltage across resistor 47 and the base-emitter junction of transistor 45 thus guaranteeing continuous conduction of this transistor and preventing a break in the feedback loop.

Collector current of the transistor 45 flows into the emitter of the transistor 55, and the collector current of the transistor 55 is fed to the emitter of the transistor 20. When the output reference level drops, a lower positive potential will appear at the base of the transistor 45 to increase the base-emitter current. Additional current will therefore flow through the emitter-collector circuit of the transistor 45 and into the emitter of the transistor 55. The base-emitter current of the transistor 55 increases to produce a higher feedback current at the collector *55c* for application into the emitter *20e* by way of the resistor 58. This current will be proportional to the difference in voltage between the output reference level at terminal 26 and the reference voltage across the capacitor 50. The current will be sufficient in amount to maintain the reference level of the output terminal 26 at the desired value. In the preferred embodiment, the reference level at the output terminal 26 was maintained within plus or minus .4 volt under worst case conditions of plus or minus 5% voltage and component variations.

Many of the components utilized in the above-described circuits are not necessary for basic circuit operation but are utilized in the preferred embodiment for a special application and a higher degree of accuracy. For example, resistor 56, transistor 55 and resistor 58 are used only as power and voltage limiting devices to protect transistor 45 from the high voltages and currents involved, that is, the reverse bias potential applied across the base-collector junction of the transistor 45 might exceed the breakdown point if the collector *45c* were connected directly to the emitter *20e*. The transistor 15 and the resistor 18 could be eliminated and the zener diode replaced with conventional diode if a more inferior clamp circuit could be tolerated. The resistors 32 and 33 and the voltage divider 46 could be eliminated if bias voltage sources of the desired level were available.

Typical component values for one application are given below; however, they and the voltage values shown in the drawings are given by way of example and the invention is not to be limited thereto.

| | | |
|---|---|---|
| Resistor 12 | | 200K |
| Resistor 18 | | 16K |
| Resistor 22 | | 1.0K |
| Resistor 23 | ohms | 510 |
| Resistor 25 | do | 910 |
| Resistor 32 | | 1.2K |
| Resistor 33 | | 1.0K |
| Resistor 34 | | 6.8K |
| Resistor 37 | ohms | 56 |
| Resistor 42 | | 39K |
| Resistor 43 | | 430K |
| Resistor 47 | ohms | 51 |
| Resistor 48 | do | 820 |
| Resistor 56 | do | 820 |
| Resistor 58 | do | 300 |
| Zener diode breakdown: | | |
| Diode 11 | v | 12 |
| Diode 51 | v | 7.6 |
| Capacitor 17 | mf | .068 |
| Capacitor 35 | mf | 10 |
| Capacitor 50 | mf | 10 |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A voltage level clamp circuit comprising
   an input circuit adapted to receive a continuous unreferenced signal and including means for clamping the maximum voltage excursions of one polarity to a desired value,
   circuit means including a transistor having emitter and collector terminals and a base terminal coupled to the input circuit for producing at the collector terminal the input signals in inverted form and referenced to a desired voltage level,
   a source of fixed reference potential, means including a differential amplifier coupled to the collector terminal of the transistor for comparing the collector reference level with the fixed reference potential and producing a feedback current the value of which is a function of the difference between the collector reference level and the fixed reference potential, and means coupling the differential amplifier to the emitter terminal of the transistor for injecting the feedback current into the emitter terminal to maintain the collector reference level constant.

2. A voltage level clamp circuit comprising a pair of transistors each having base, emitter and collector terminals, means connecting one of the transistors for operation in a common collector configuration and the other in a common emitter configuration, the base terminal of the other transistor being coupled to the emitter terminal of the one transistor, a capacitor for applying input signals to the base terminal of the one transistor.

means coupled to the base terminal of the one transistor clamping the maximum input signal level of one polarity to a predetermined value, thereby establishing a reference level at the collector terminal of the other transistor, a source of fixed reference potential, means including a differential amplifier coupled to the collector terminal of the other transistor for producing a feedback current proportional to the difference between the collector reference level with the fixed reference potential, and means coupling the differential amplifier to the emitter terminal of the other transistor for injecting the feedback current into the emitter terminal to maintain the collector reference level constant.

3. The clamp circuit claimed in claim 2 together with feedback means coupled to the emitter of said other transistor to provide a constant voltage gain in the other transistor.

4. A voltage level clamp circuit comprising a pair of transistors each having base, emitter and collector terminals, means connecting one of the transistors for operation in a common collector configuration and the other in a common emitter configuration, the base terminal of the other transistor being coupled to the emitter terminal of the one transistor, a capacitor for applying input signals to the base terminal of the one transistor, means including a zener diode coupled to the base terminal of the one transistor clamping the maximum negative excursions of the input signals to a predetermined negative value, thereby establishing a reference voltage at the collector terminal of the one transistor, a source of fixed reference potential, means including a differential amplifier coupled to the collector terminal of the other transistor and to the source for producing a feedback current proportional to the difference between the fixed reference potential and the collector reference voltage, and means coupling the differential amplifier to the emitter terminal of the other transistor for injecting the feedback current into the emitter terminal to maintain the collector reference voltage constant.

5. A voltage level clamp circuit comprising a pair of transistors each having base, emitter and collector terminals, means connecting one of the transistors for operation in a common collector configuration and the other in a common emitter configuration, the base terminal of the other transistor being coupled to the emitter terminal of the one transistor, a capacitor for applying a continuous input signal to the base terminal of the one transistor, means coupled to the base terminal of the one transistor clamping the maximum input signal excursion of one polarity to a predetermined value, thereby establishing a corresponding reference voltage at the collector terminal of the other transistor, a source of fixed reference potential, a second capacitor, means coupling the second capacitor to the collector terminal of the other transistor and charging the capacitor to a value substantially equal to said collector reference voltage, a transistor differential amplifier having its base terminal coupled to the second capacitor and its emitter coupled to the fixed reference potential for producing an output current proportional to the difference between the second capacitor voltage and the fixed reference potential, and means coupling the differential amplifier output to the emitter terminal of the other amplifier to maintain the collector reference voltage constant.

6. The clamp circuit claimed in claim 5 wherein the last-mentioned means includes a forward biased common base transistor having an emitter terminal receiving the output current of the differential amplifier and a collector terminal coupled to the emitter terminal of said other transistor.

7. A voltage level clamp circuit comprising a pair of transistors each having base, emitter and collector terminals, means connecting one of the transistors for operation in a common collector configuration and the other in a common emitter configuration, the base of the other transistor being coupled to the emitter of the one transistor, a capacitor for applying a continuous input signal to the base of the one transistor, means including a zener diode coupled to the base of the one transistor clamping the maximum input signal excursions of one polarity to a predetermined value, thereby establishing a corresponding reference voltage at the collector of the other transistor, a source of fixed reference potential, a first emitter follower having an input coupled to the collector of the other transistor and having an output impedance element, a second capacitor, means coupling the second capacitor across the output impedance to charge the capacitor to a voltage substantially equal to said collector reference voltage, a second emitter follower having an input coupled to the second capacitor to produce at its output a voltage substantially equal to the capacitor voltage, a transistor differential amplifier having its base coupled to the output of the second emitter follower and its emitter coupled to the fixed reference potential for producing an output current proportional to the difference between the second capacitor voltage and the fixed reference potential, and means coupling the differential amplifier output to the emitter of the other amplifier to maintain the collector reference voltage constant.

8. A voltage level clamp circuit comprising an input circuit adapted to receive a continuous unreferenced signal and including means for clamping the maximum voltage excursions of one polarity to a desired value, circuit means including a transistor having emitter and collector terminals and a base terminal coupled to the input circuit for producing at the collector terminal the input signals in inverted form and referenced to a desired voltage level, a capacitor, means coupling the capacitor to the collector terminal and charging the capacitor to a value substantially equal to the collector reference voltage, a source of fixed reference potential, a transistor amplifier coupled to the capacitor and to the source of fixed potential for producing a feedback current proportional to the difference between the capacitor charge and the fixed reference potential, and means coupling the transistor amplifier to the emitter terminal of the transistor for injecting the feedback current into the emitter terminal to maintain the collector reference level constant.

9. A voltage level clamp circuit comprising an input circuit adapted to receive a continuous unreferenced signal and including means for clamping the maximum voltage excursions of one polarity to a desired value, circuit means including a transistor having emitter and collector terminals and a base terminal coupled to the input circuit for producing at the collector terminal the input signals in inverted form and referenced to a desired voltage level, a source of fixed reference potential, a first emitter follower having an input coupled to the collector of the transistor and having an output impedance element, a capacitor, means coupling the capacitor across the output impedance element to charge the capacitor to a voltage substantially equal to the collector reference level, a second emitter follower having an input coupled to the capacitor to produce at its output a voltage substantially equal to the capacitor voltage, a differential amplifier having a base terminal coupled to the output of the second emitter follower and an emitter terminal coupled to the fixed reference potential for producing an output current proportional to the difference between the capacitor voltage and the fixed reference potential, and means coupling the differential amplifier output to the emitter terminal of the other amplifier.

10. A circuit for maintaining a constant reference voltage at the collector of a common emitter transistor amplifier which reference voltage tends to vary in accordance with variations in component and bias voltage values comprising, a source of fixed reference potential, a first emitter follower having an input coupled to the collector of the transistor and having an output impedance element, a capacitor, means coupling the capacitor across the output impedance to charge the capacitor to a value substantially equal to said collector reference voltage, a second emitter follower having an input coupled to the capacitor to produce at its output a voltage substantially equal to the capacitor voltage, a transistor amplifier having its base coupled to the output of the second emitter follower and its emitter coupled to the fixed reference potential for producing an output current proportional to the difference between the second capacitor voltage and the fixed reference potential, and means coupling the differential amplifier output to the emitter of said common emitter transistor amplifier.

11. A circuit for maintaining a constant reference voltage at the collector of a common emitter transistor amplifier which reference voltage tends to vary in accordance with variations in component and bias voltage values comprising, a source of fixed reference potential, a first emitter follower having an input coupled to the collector of the transistor and having an output impedance element, a capacitor, means coupling the capacitor across the output impedance to charge the capacitor to a value substantially equal to said collector reference voltage, a second emitter follower having an input coupled to the capacitor to produce at its output a voltage substantially equal to the capacitor voltage, a transistor amplifier having its base terminal coupled to the output of the second emitter follower and its emitter terminal coupled to the fixed reference potential for producing an output current proportional to the difference between the second capacitor voltage and the fixed reference potential, and means including a common base transistor amplifier coupling the differential amplifier output to the emitter of said common emitter transistor amplifier.

12. A circuit for producing an output current which is a function of the relative voltage levels of a first voltage source and maximum excursion of one polarity of a variable level signal comprising a first emitter follower having an input receiving the variable level signal and having an output impedance element.

a capacitor, means including a semiconductor element coupling the capacitor across the output impedance and maintaining a capacitor voltage substantially equal to said maximum excursion, a second emitter follower having an input coupled to the capacitor to produce at its output a voltage substantially equal to the capacitor voltage, and a transistor differential amplifier coupled to the output of the second emitter follower and to the first voltage source for producing an output current which is a function of the difference between the second capacitor voltage and the source.

References Cited by the Examiner

UNITED STATES PATENTS

| | | | |
|---|---|---|---|
| 2,881,266 | 4/59 | Miller | 330—68 |
| 2,912,580 | 11/59 | Hurford | 328—173 |

JOHN W. HUCKERT, *Primary Examiner.*